United States Patent
Lam

(10) Patent No.: US 10,294,972 B2
(45) Date of Patent: May 21, 2019

(54) ROTATION-TYPE JOGGLE STRUCTURE AND FURNITURE HAVING THE SAME

(76) Inventor: Pok Yin Lam, Hong Kong (CN)

( * ) Notice: Subject to any disclaimer, the term of this patent is extended or adjusted under 35 U.S.C. 154(b) by 1410 days.

(21) Appl. No.: 14/234,630

(22) PCT Filed: May 11, 2012

(86) PCT No.: PCT/CN2012/075385
§ 371 (c)(1),
(2), (4) Date: Jun. 18, 2014

(87) PCT Pub. No.: WO2013/067804
PCT Pub. Date: May 16, 2013

(65) Prior Publication Data
US 2014/0294495 A1    Oct. 2, 2014

(30) Foreign Application Priority Data

Nov. 11, 2011 (CN) .................... 2011 2 0446381 U

(51) Int. Cl.
*F16B 5/10* (2006.01)
*A47B 13/00* (2006.01)
(Continued)

(52) U.S. Cl.
CPC .............. *F16B 5/10* (2013.01); *A47B 13/003* (2013.01); *A47C 4/02* (2013.01); *F16B 12/12* (2013.01);
(Continued)

(58) Field of Classification Search
CPC ......... Y10T 403/7005; Y10T 403/7073; Y10T 403/7094; Y10T 403/7096; Y10T 403/73; Y10T 403/7045; A63H 33/067; A63H 33/08; A63H 33/082; F16B 5/0052; F16B 5/0614; F16B 12/12; F16B 12/28; F16B 12/46; F16B 12/125; F16B 2012/463;
(Continued)

(56) References Cited

U.S. PATENT DOCUMENTS 1,573,312 A * 2/1926 Fritz ........................ E03B 9/10
                                                    137/371
1,653,296 A * 12/1927 Kremenek ............. A47B 11/00
                                                    108/142
(Continued)

FOREIGN PATENT DOCUMENTS

CN          1948767 A  *  4/2007

*Primary Examiner* — Amber R Anderson
*Assistant Examiner* — Nahid Amiri
(74) *Attorney, Agent, or Firm* — George G. Wang; Bei & Ocean

(57) ABSTRACT

It relates to a joggle structure and a furniture with the same. The joggle structure has a groove and a tongue cooperating with the groove. The groove has a bottom surface and two groove side faces. Width of the groove gradually increases from groove opening to the bottom surface. The two groove side faces are a part of a rotational curved surface around a rotation axis arranged in the middle of the two groove side faces. The tongue has two tongue side faces for matching with the two groove side faces, and the two tongue side faces have the same shape as the groove side faces. In the process of engaging, the tongue is rotated with respect to the groove and joggled into the groove to make the two tongue side faces attach to the two groove side faces.

15 Claims, 15 Drawing Sheets

(51) Int. Cl.
  *F16B 12/12* (2006.01)
  *A47C 4/02* (2006.01)
(52) U.S. Cl.
  CPC .... *F16B 12/125* (2013.01); *A47B 2230/0077* (2013.01); *A47B 2230/0092* (2013.01); *Y10T 403/7007* (2015.01)
(58) Field of Classification Search
  CPC ................ F16B 2012/466; F16B 5/008; F16B 12/2009; F16B 12/22; F16B 12/32; F16B 12/34; A47B 13/003; A47B 2230/0077; A47B 2230/0092; A47C 4/02; A47C 4/21; F16M 13/00
  USPC ................. 403/DIG. 11, DIG. 12, DIG. 13; 108/153.1, 156, 157.1, 157.18, 158, 108/158.11; 312/26, 133, 135, 241
  See application file for complete search history.

(56) References Cited

U.S. PATENT DOCUMENTS

| | | | | |
|---|---|---|---|---|
| 2,191,007 | A * | 2/1940 | Bussey | A47B 3/0803 108/115 |
| 2,452,230 | A * | 10/1948 | Derham | A45D 33/006 220/298 |
| 2,534,952 | A * | 12/1950 | Comer | A47B 57/42 108/107 |
| 3,189,379 | A * | 6/1965 | Potter | A47B 83/02 108/151 |
| 3,266,202 | A * | 8/1966 | Furer | E04B 1/4107 248/323 |
| 3,309,830 | A * | 3/1967 | Fitzgerald | E04B 1/4185 52/426 |
| 3,442,311 | A * | 5/1969 | Rhyne | B27F 1/00 144/354 |
| 3,931,949 | A * | 1/1976 | Waligorski | A47B 11/00 108/142 |
| 4,040,222 | A * | 8/1977 | Cull | E04F 13/0853 52/365 |
| 4,858,777 | A * | 8/1989 | Morel | B65D 41/0471 215/295 |
| 4,932,916 | A * | 6/1990 | Blickle | A63H 33/08 446/124 |
| 5,197,879 | A * | 3/1993 | Fowler, III | A61C 7/02 433/159 |
| 5,359,944 | A * | 11/1994 | Steinbeck | A47B 13/08 403/294 |
| 5,454,331 | A * | 10/1995 | Green | A47B 47/042 108/180 |
| 5,673,882 | A * | 10/1997 | Huang | A47B 17/00 108/158.11 |
| 5,752,450 | A * | 5/1998 | Roesner | A47B 83/02 108/161 |
| 5,845,658 | A * | 12/1998 | Sussman | A45D 33/006 132/287 |
| 5,873,554 | A * | 2/1999 | Nobuchi | G06F 1/162 248/278.1 |
| 5,911,180 | A * | 6/1999 | Mullens | A47B 96/028 108/153.1 |
| 5,957,631 | A * | 9/1999 | Hecht | B23B 51/00 408/144 |
| 6,220,184 | B1 * | 4/2001 | Sack | A47B 11/00 108/139 |
| 6,267,065 | B1 * | 7/2001 | Lin | A47B 13/003 108/157.14 |
| 6,318,578 | B1 * | 11/2001 | Patterson | A45D 40/0068 215/332 |
| 6,820,379 | B1 * | 11/2004 | Krinner | E04H 12/2223 108/156 |
| 6,968,790 | B1 * | 11/2005 | Kocsis | A47B 83/02 108/11 |
| 8,573,849 | B2 * | 11/2013 | Leiseder | E05D 11/04 384/452 |
| 9,593,704 | B2 * | 3/2017 | Leiseder | F16B 3/04 |
| 2002/0070630 | A1 * | 6/2002 | Dawson | H02K 1/185 310/254.1 |
| 2002/0139283 | A1 * | 10/2002 | Janata | G01M 11/04 108/143 |
| 2008/0245280 | A1 * | 10/2008 | Wainland | A47B 13/003 108/153.1 |
| 2009/0000529 | A1 * | 1/2009 | Cheng | A47B 13/023 108/157.1 |
| 2010/0064947 | A1 * | 3/2010 | Bettinger | A47B 3/002 108/157.18 |
| 2013/0025228 | A1 * | 1/2013 | Kilgore | E04F 15/02044 52/578 |
| 2014/0059829 | A1 * | 3/2014 | Weber | A47B 47/042 29/428 |
| 2014/0294495 | A1 * | 10/2014 | Lam | A47C 4/02 403/349 |
| 2016/0025125 | A1 * | 1/2016 | Bonney | F16B 12/125 403/376 |

\* cited by examiner

100 # ROTATION-TYPE JOGGLE STRUCTURE AND FURNITURE HAVING THE SAME

This application is a national phase application of PCT/CN2012/075385, filed May 11, 2012, which claims priority from CN Application No. 201120446381.8, filed Nov. 11, 2011. The contents of both prior applications are incorporated herein in the entirety by reference.

TECHNICAL FIELD

The present invention relates to a joggle structure and furniture, and more particularly to a rotation-type joggle structure and furniture having the same.

DESCRIPTION OF THE RELATED ART

Conventional furniture uses solid wood as main material, and components thereof are mostly connected by mortise-tenon structures. Very often, glue is smeared at mortise-tenon locations to enhance the connecting strength, and metal connectors are rarely used. The furniture with the above structure is solid, but it is difficult to be disassembled and re-assembled for other furniture uses. In the recent decades, engineered plates made by wood fibers, wood chips or wood veneer, are rapidly developed. Fiberboard, plywood, particleboard etc. are widely used in modern furniture manufacture. The so-called "panel furniture" is made by engineered plates connected mostly by metal connectors. The panel furniture has many advantages, such as knock-down capability and easier modeling. Since the metal connectors and the engineered plates are different in material and the contact areas thereof are small, the connection between the metal connectors and the engineered plates is likely to have problems, such as loosening, etc, thus it is easy to cause deformation on furniture or make the structure unstable, etc.

SUMMARY OF THE INVENTION

The problem solved by the present invention is providing a rotation-type joggle structure and furniture having the same, to overcome the disadvantages of the present connection structure used in the panel furniture.

In accordance with one aspect, the present invention provides a rotation-type joggle structure, which comprises a groove and, a tongue for cooperating with the groove. The groove having a bottom surface and two groove side faces. The width of the groove gradually increases from an opening to the bottom surface; and the two groove side faces are a part of a rotational curved surface. Rotation axis of the rotational curved surface is arranged in the middle of the two groove side faces. The tongue has two tongue side faces matching with the two groove side faces, and the two tongue side faces have the same shape as to the groove side faces. The tongue is rotated with respect to the groove and engaged with the groove when joggling, to make the two tongue side faces attaching to the two groove side faces.

Preferably, generatrix of the rotational curved surface is a straight line or a curved line.

In accordance with another aspect, the present invention also provides a furniture, which comprises a panel board and an abutment plate configured for supporting the panel board. The panel board and the abutment plate are connected through the above described rotation-type joggle structure.

Preferably, in the furniture of the present invention, the tongue is arranged on a bottom surface of the panel board, the groove is formed in one end of the abutment plate that connects with the panel board.

Preferably, a groove component is formed on a bottom surface of the panel board, the groove component has the groove, and the tongue is formed on an end of the abutment plate that connects to the panel board.

Preferably, the furniture includes two abutment plates, a middle groove is arranged on each abutment plates, with the middle grooves crossed with each other, the two abutment plates crossed to each other.

Preferably, the furniture includes two abutment plates, and the two abutment plates are arranged in parallel or at a certain angle.

Preferably, the furniture further includes a bottom plate arranged under a bottom end of the abutment plate, and the bottom plate is connected with the bottom end of the abutment plate through the above described rotation-type joggle structure.

Preferably, the furniture further comprises at least one fixing spiral rod, the fixing spiral rod passes through the abutment plate upwards from a bottom end of the abutment plate and is connected spirally to the panel board, and the fixing spiral rod is configured for fixing the abutment plate and the panel board together.

Preferably, the furniture further includes a footrest, a slot is arranged in the abutment plate, two ends of the footrest are fastened in the slot, and the footrest is perpendicular to the abutment plate.

The rotation-type joggle structure and the furniture having the same, have the following advantages. The side faces of the tongue and of the groove of the rotation-type joggle structure of the present invention are a part of the rotational curved-surface. The tongue and the groove can only be fastened or loosened by counter-rotation, and the contact area of the tongue and the groove is larger than that of the conventional mortise-tenon structure, so that the joggle structure of the present invention is more solid, and the connection strength thereof is increased. Thus the joggle structure of the present invention is not easy to be loosened, and the furniture thereof does not rely on metal connectors which have small contact areas to support the related structure.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
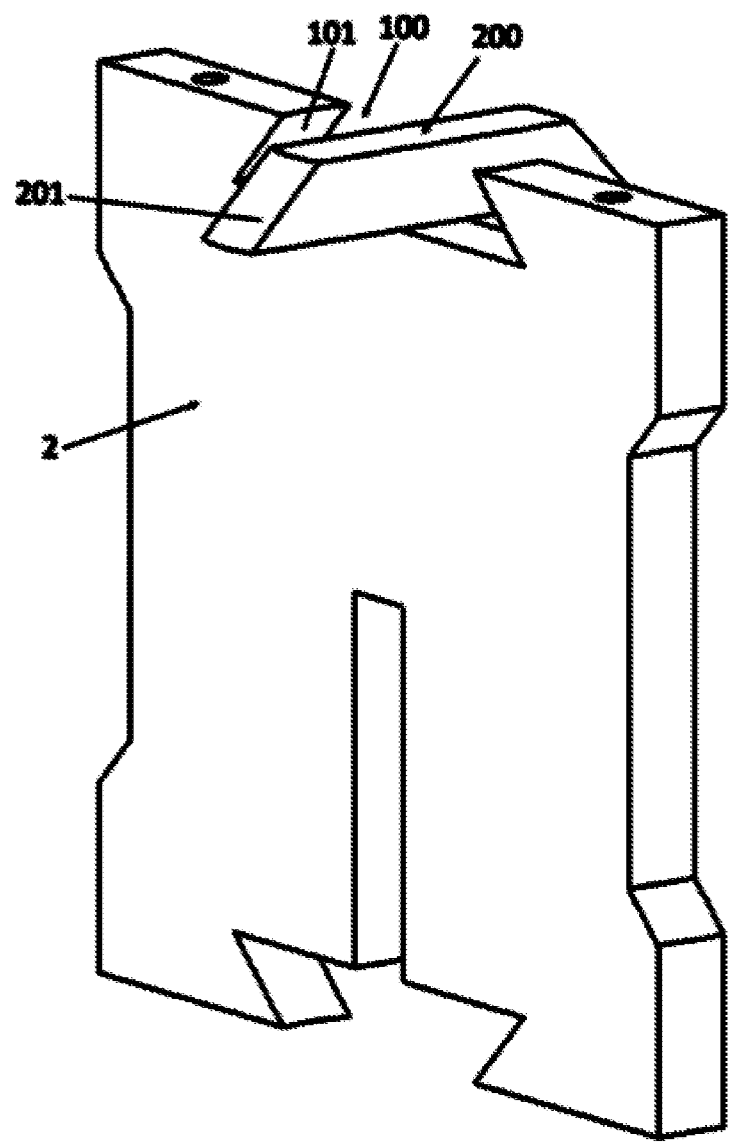
FIG. 1 is a schematic view of a rotation-type joggle structure in accordance with the first exemplary embodiment of the present invention, while a tongue thereof is not rotationally engaged with a groove thereof.
Figure 2:
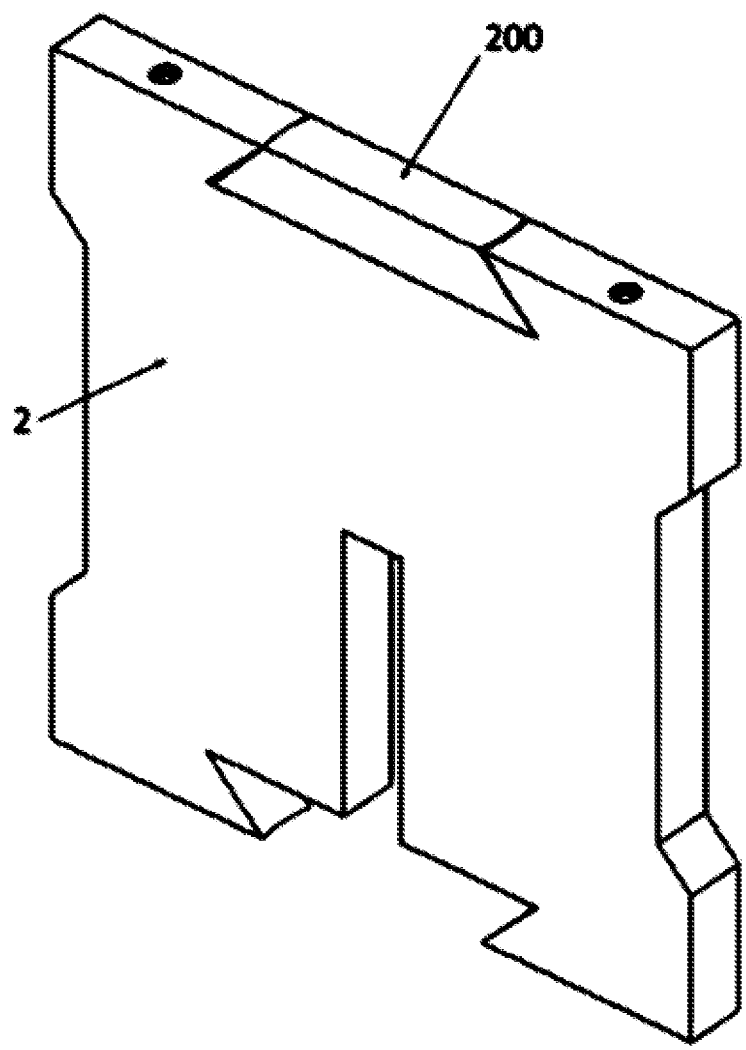
FIG. 2 is a schematic view of the rotation-type joggle structure in accordance with the first exemplary embodiment of the present invention, while the tongue thereof is rotationally engaged with the groove thereof.
Figure 3:
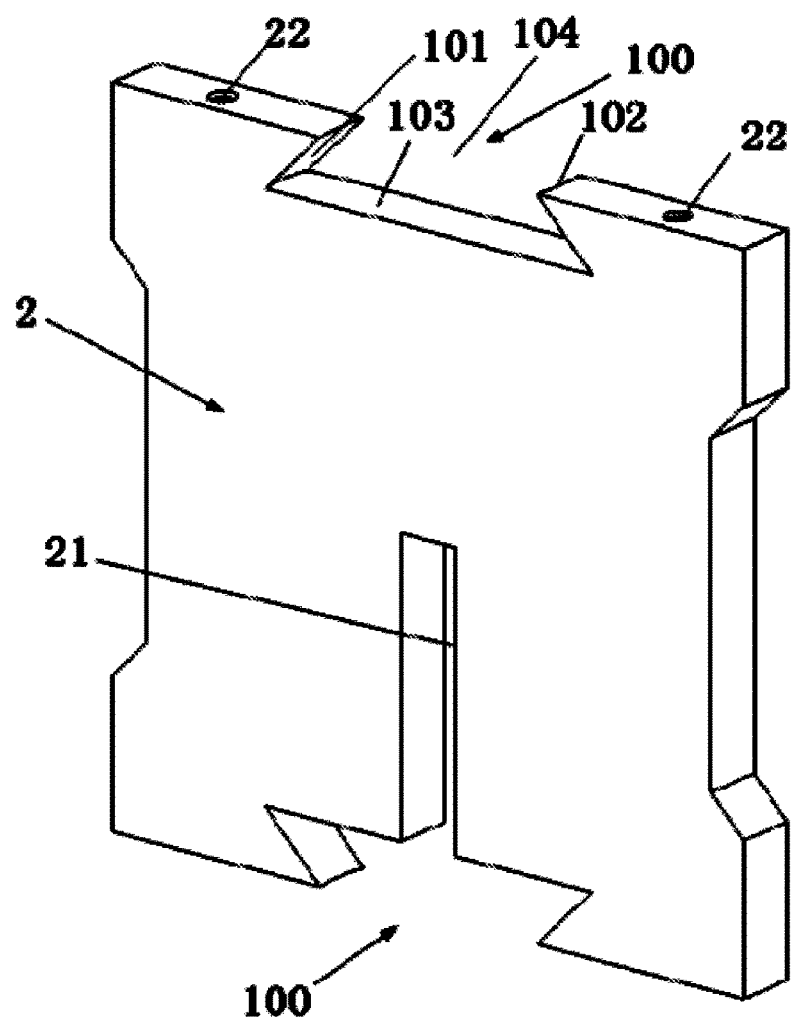
FIG. 3 is a schematic view of the rotation-type joggle structure in accordance with the first exemplary embodiment of the present invention, while the abutment plate is arranged with a groove at two ends respectively.
Figure 4:
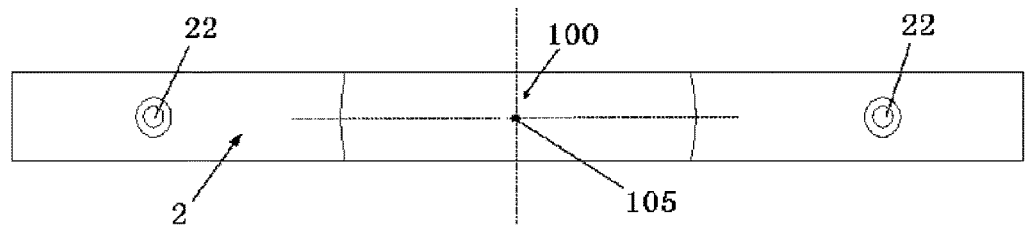
FIG. 4 is a top view of the abutment plate as shown in FIG. 3.
Figure 5:
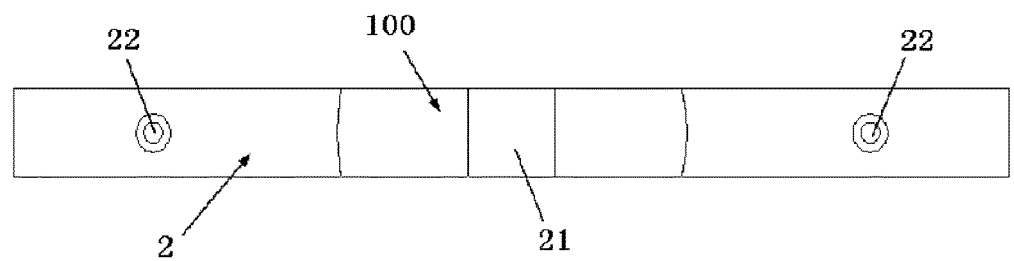
FIG. 5 is a bottom view of the abutment plate as shown in FIG. 3.

FIGS. 1 and 2 are schematic views of an abutment plate 2 with a groove 100 cooperating with a tongue 200, which show a rotation-type joggle structure in accordance with a first exemplary embodiment of the present invention. Now, it takes the groove 100 arranged at the top of the abutment plate 2, and the tongue 200 cooperating with the groove 100 as an example to describe the rotation-type joggle structure of the present invention in detail. Referring to FIG. 3 to FIG. 5, the groove 100 comprises a bottom surface 103, and two groove side faces 101, 102. The width of the groove 100 gradually increases from the opening 104 to the bottom surface 103. A cross-section of the groove 100 is approximately dovetail-shaped. The two groove side faces 101, 102 are a part of a rotational curved-surface, and a rotation axis 105 of the rotational curved-surface is perpendicular to the bottom surface 103. The rotation axis 105 is in the middle of the two side faces 101 and 102. Generatrix of the rotational curved-surface is an intersection line where a side face of the groove 100 intersects with a surface of the abutment plate 2, and the generatrix may be a straight line or a curved line. The two groove side faces 101, 102 are sections formed in the abutment plate 2 by rotating the generatrix around the rotation axis 105.

Figure 6:
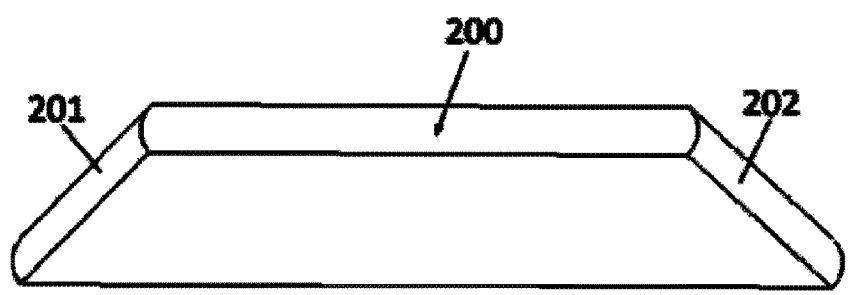
FIG. 6 is a schematic view of a tongue of the rotation-type joggle structure in accordance with the first exemplary embodiment of the present invention.
Figure 7:
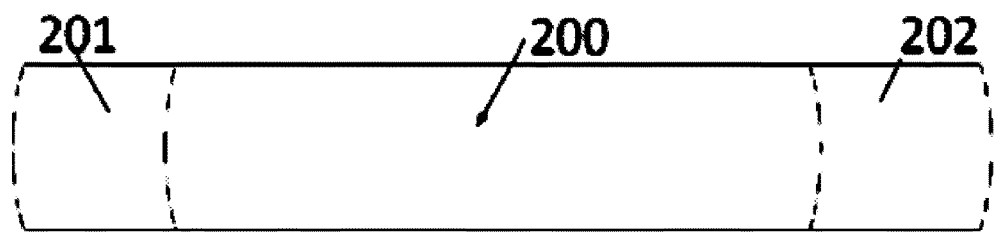
FIG. 7 is a top view of the tongue as shown in FIG. 6.
Figure 8:
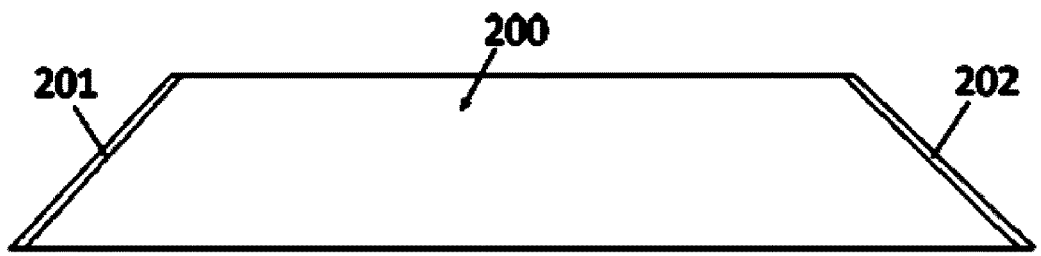
FIG. 8 is a front view of the tongue as shown in FIG. 6.

FIG. 6 to FIG. 8 are schematic views of tongue 200 of the rotation-type joggle structure of the present invention. Tongue 200 is suitable for engaging with groove 100, and tongue 200 has two tongue side faces 201, 202. The shape of the two tongue side faces 201, 202 is the same as that of the two groove side faces 101, 102, and all of them are a part of a rotational curved-surface. Since all side faces of the tongue 200 and the groove 100 are a part of the rotational curved-surface, the tongue 200 cannot be directly engaged with the groove 100. Referring to FIG. 1, it is required to firstly offset the tongue 200 and the groove 100 with each other at a certain angle to insert the tongue 200 into the groove 100, and then rotate the tongue 200 so that the tongue 200 wedges into the groove 100. Referring to FIG. 2, the groove side faces 101, 102 are fitted with the tongue side faces 201, 202, respectively. Since the tongue 200 and the groove 100 are fastened and loosened only by a rotational movement, when the tongue 200 and the groove 100 are forced by other directions of movement, the tongue 200 and the groove 100 will not disengage. Therefore, this joggle structure is more reliable than the conventional dovetail structure, and is stronger than the conventional mortise-tongue structure, because the acting surface of the tongue 200 and the groove 100 is larger, that is, the areas of the groove side faces 101, 102 and the tongue side surface 201, 202 are larger.

Figure 9:
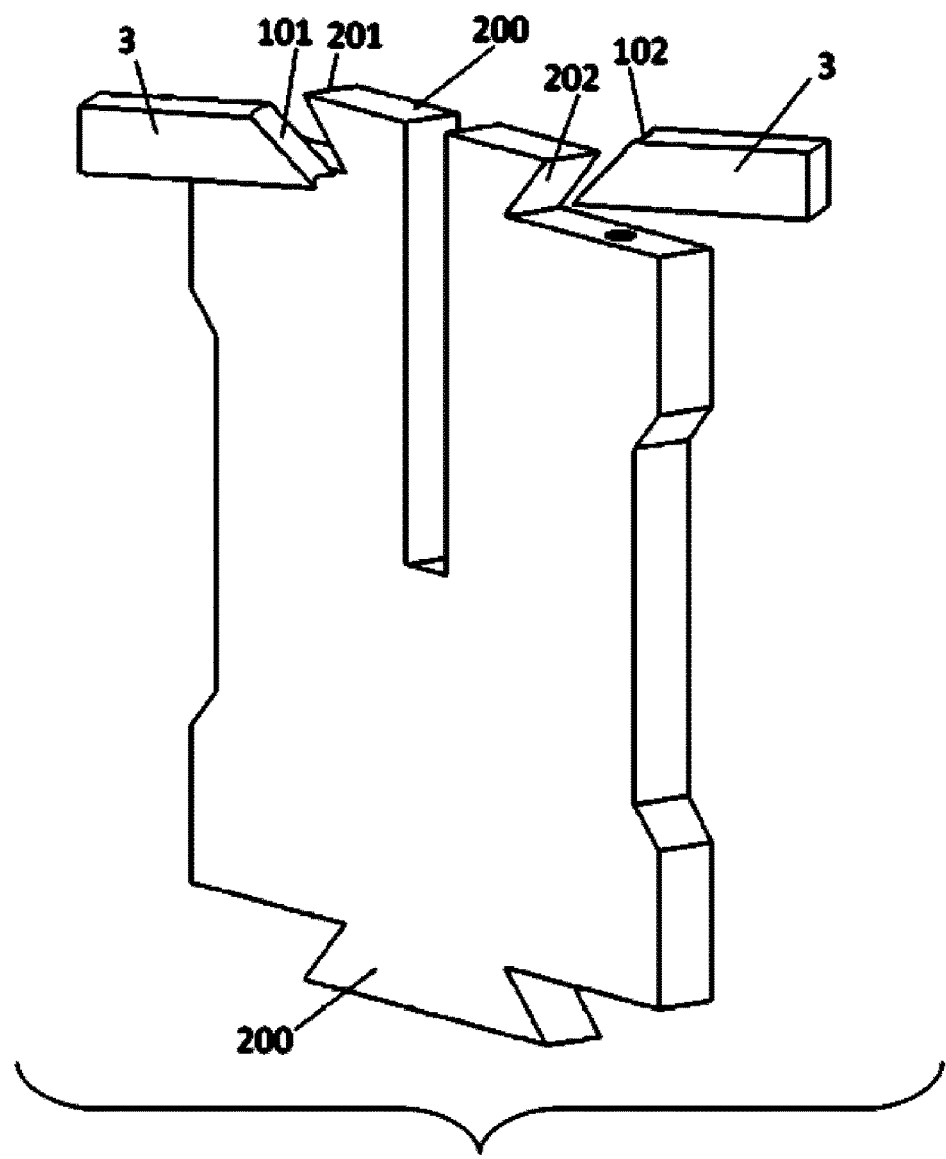
FIG. 9 is a schematic view of a rotation-type joggle structure in accordance with a second exemplary embodiment of the present invention, while a tongue thereof is not rotationally engaged with a groove thereof.
Figure 10:
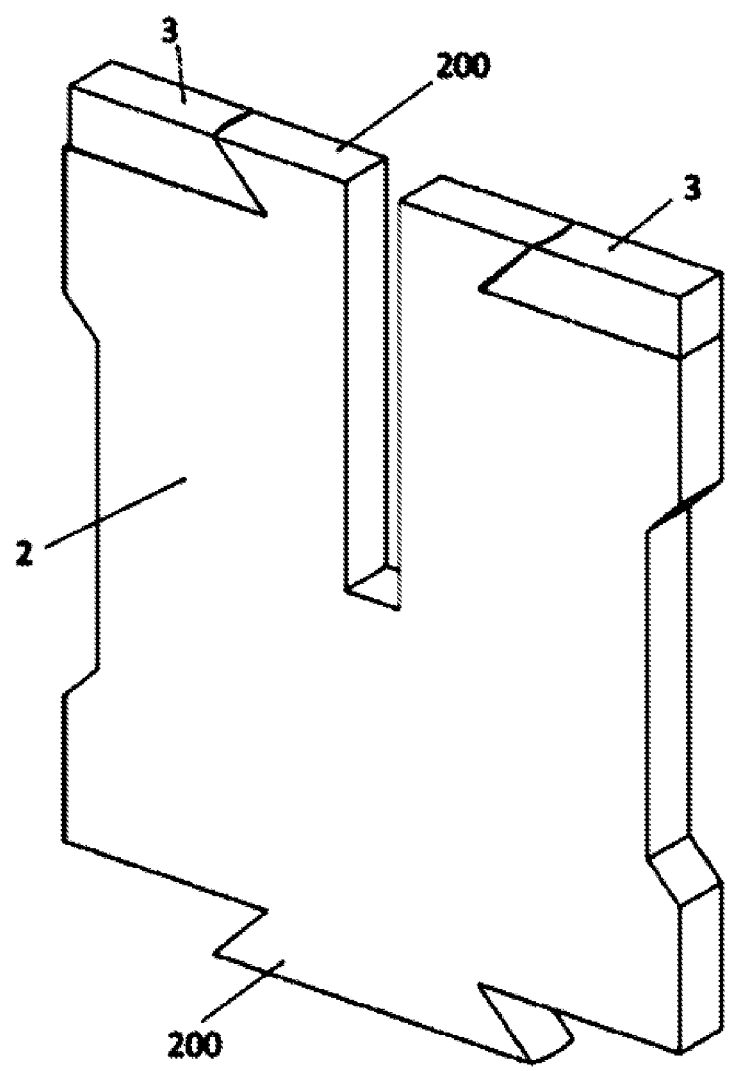
FIG. 10 is a schematic view of the rotation-type joggle structure in accordance with the second exemplary embodiment of the present invention, while the tongue thereof is rotationally engaged with the groove thereof.

FIG. 9 and FIG. 10 are schematic views of an abutment plate with tongues 200 cooperating with a groove 100 of a groove component 3, which shows a rotation-type joggle structure in accordance with a second exemplary embodiment of the present invention. Differences from the first exemplary embodiment are that, in this exemplary embodiment, the abutment plate 2 has tongues 200 at two ends respectively, and the groove 100 is formed by a groove component 3. In this exemplary embodiment, the groove component 3 is consisted of two independent locking-blocks, and these two locking-blocks are arranged oppositely and the groove 100 is formed there between. Groove side faces 101, 102 are arranged at the two locking-blocks respectively, and the groove side faces 101, 102 are a part of a rotational curved-surface. The shape of the tongue 200 here is the same as to the tongue of the first exemplary embodiment, and tongue side faces 201, 202 have the same shape as the groove side surface 201, 202. In this exemplary embodiment, the cooperating method of the groove 100 and the tongue 200 is same to that of the first exemplary embodiment, and will not be described here. It should be noted that, the groove component 3 may be any component, that has the groove 100 formed thereon.

The above has described the rotation-type joggle structure, and the following will describe the furniture having the joggle structure in detail.

Figure 11:
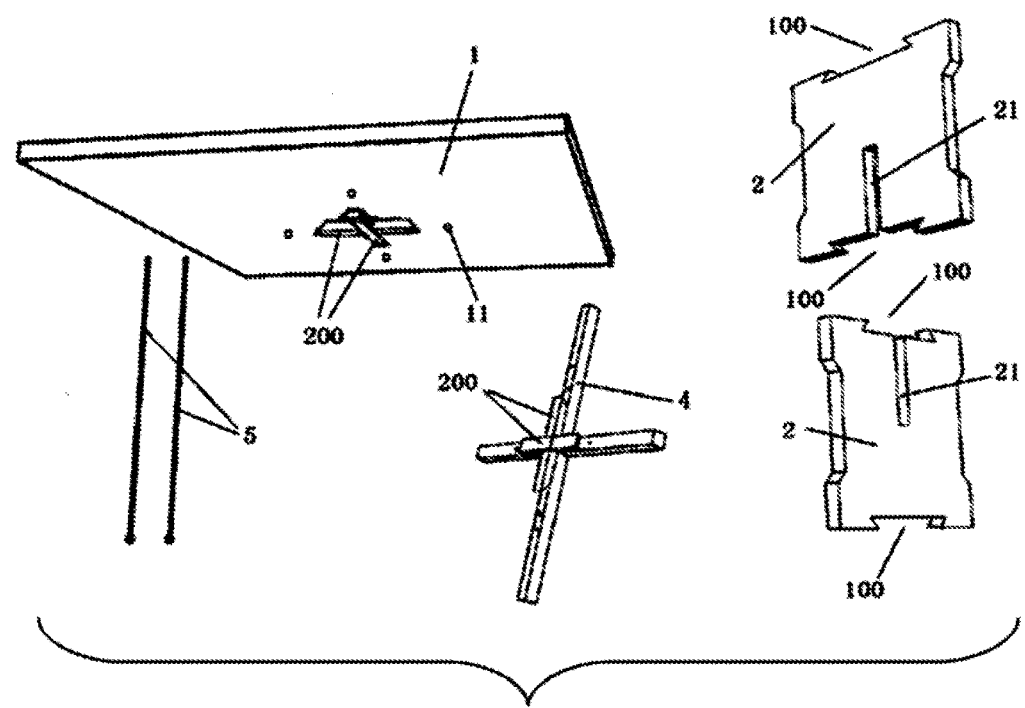
FIG. 11 is a schematic exploded view of a furniture with the rotation-type joggle structure in accordance with the first exemplary embodiment of the present invention.
Figure 12:
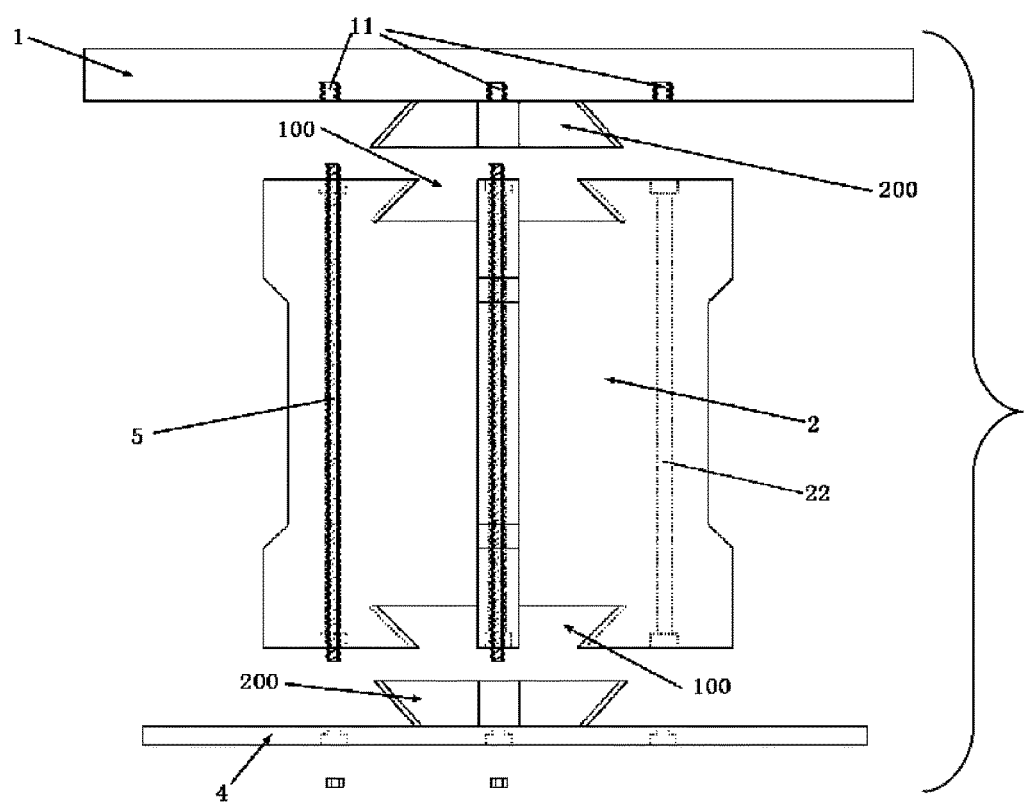
FIG. 12 is a front view of the furniture with the rotation-type joggle structure in accordance with the first exemplary embodiment of the present invention.

FIG. 11 and FIG. 12 show furniture with the rotation-type joggle structure in accordance with a first exemplary embodiment of the present invention. The furniture of the exemplary embodiment is a coffee table, comprising a panel board 1, two abutment plates 2 and a bottom plate 4. The panel board 1 and the abutment plates 2, the abutment plates 2 and the bottom plate 4, are connected by the above mentioned rotation-type joggle structure, and the abutment plates 2 are to support the panel board 1. In detail, two tongues 200, which are intersected and cross-shaped, are fixed at the bottom surface of the panel board 1. The two abutment plates 2 have the same shape. Grooves 100 are arranged at two ends (up end and bottom end) of each abutment plate 2, and each abutment plate 2 also has a middle groove 21 arranged in the middle thereof. The two abutment plates are assembled in cross shape by the middle grooves 21. The grooves 100 of the two abutment plates 2 are also in cross shape, corresponding to the two cross-shaped tongues 200. Two cross-shaped tongues 200 are arranged on the bottom plate 4, and engaged with the grooves 100 of the bottom surfaces of the two abutment plates 2. The cooperating method here is same to that of the panel board 1 and the abutment plates 2, and will not described again. The coffee table further comprises fixing spiral rods 5 that pass through the bottom plate 4, the abutment plates 2 in sequence, from bottom to top, and are spirally connected with the panel board 1. The panel board 1 has threaded holes 11 at the bottom surface thereof, and the abutment plates 2 have through holes 22 configured for fixing spiral rods 5 to pass through. Each abutment plate 2 may cooperate with two fixing spiral rods 5, and the fixing spiral rods 5 make the connection of the abutment plates 2, the panel board 1, and the bottom plate 4 more reliable, which also prevent the abutment plates 2 from rotating, and thus prevent the rotation-type joggle structure from loosening.

While assembling the coffee table of FIG. 11 and FIG. 12, the tongues 200 are firstly fixed on the bottom surface of the panel board 1, and then the two abutment plates 2 are crossed. Offset the grooves 100 of the abutment plates and the tongues 200 with a certain angle, and then the abutment plates 2 are rotated to fasten the tongues 200 and the grooves 100. While assembling the bottom plate 4, the tongues 200 of the bottom plate 4 and the grooves 100 of the bottom end of the abutment plates 2 are rotationally fastened. Then, the fixing spiral rods 5 pass through the bottom plate 4 and the abutment plates 2 and then fastened on the panel board 1 to complete the assembly of the coffee table. While disassembling, the operation thereof is processed in a sequence opposite to those of the assembly.

Figure 13:
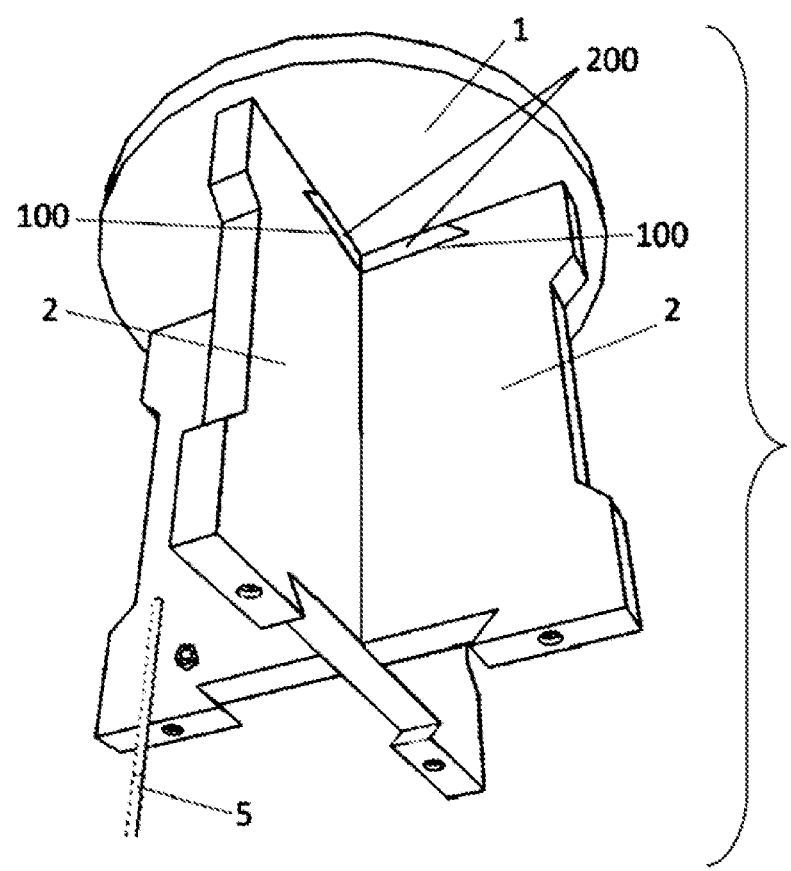
FIG. 13 is a schematic view of a furniture with the rotation-type joggle structure in accordance with a second exemplary embodiment of the present invention.

FIG. 13 shows furniture with the rotation-type joggle structure in accordance with a second exemplary embodiment of the present invention. Differences from the first exemplary embodiment are that, the panel board 1 of the furniture of this exemplary embodiment is in round shape, and there is no bottom plate. The exemplary embodiment also has two cross-shaped abutment plates 2 same to the abutment plates of the first exemplary embodiment. The abutment plates 2 and the panel board 1 are connected by the rotation-type joggle structure. The spiral rods 5 pass through the abutment plates 2 and then, are fastened on the panel board 1. The bottom of the abutment plates 2 directly contact with the floor, instead of using a bottom plate. Alternatively, plastic pins may be added to the bottom surface of the abutment plates 2.

Figure 14:
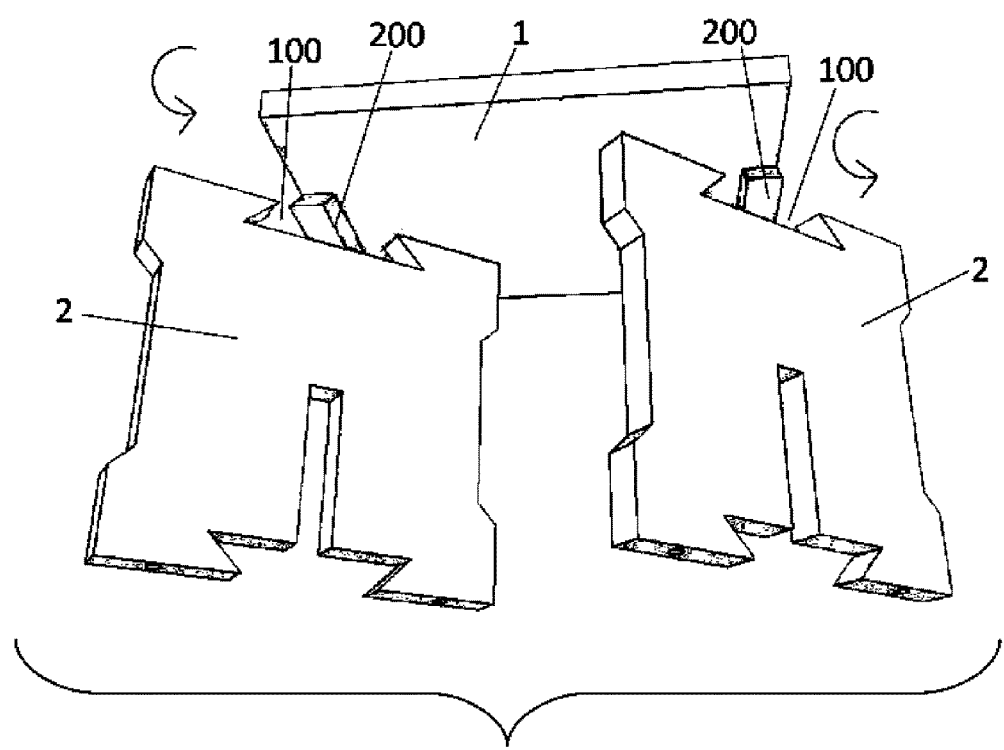
FIG. 14 is a schematic view of a furniture with the rotation-type joggle structure in accordance with a third exemplary embodiment of the present invention.

FIG. 14 shows furniture with the rotation-type joggle structure in accordance with a third exemplary embodiment of the present invention. The furniture of the exemplary embodiment is a stool, comprising a panel board 1 and two abutment plates 2. The shapes of the abutment plates 2 are same to those of the abutment plates of the above exemplary embodiments. In this exemplary embodiment, the two abutment plates 2 are connected with the panel board 1 by rotation-type joggle structures respectively. The two abutment plates 2 are arranged in parallel to support the panel board 1 at two ends of the panel board 1. Two parallel tongues 200 are arranged on a bottom surface of the panel board 1 to engage with grooves 100 of the two abutment plates 2. The abutment plates 2 are fixed with the panel board 1 through fixing spiral rods.

Figure 15:
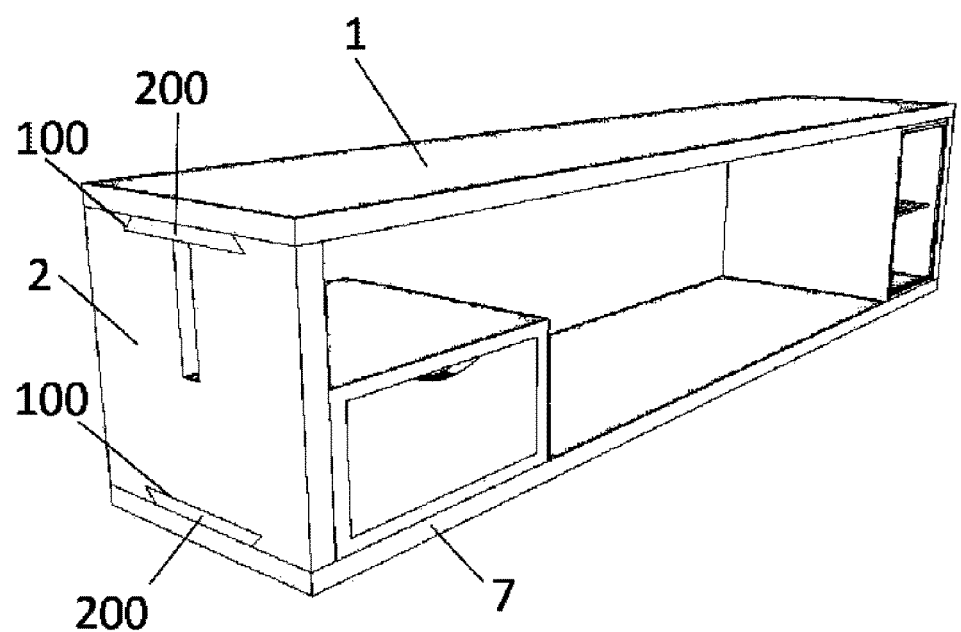
FIG. 15 is a schematic view of a furniture with the rotation-type joggle structure in accordance with a fourth exemplary embodiment of the present invention.

FIG. 15 shows furniture with the rotation-type joggle structure in accordance with a fourth exemplary embodiment of the present invention. The furniture of the exemplary embodiment is a TV cabinet, comprising a panel board 1, two abutment plates 2, a bottom board 7 and other components. Between the abutment plates 2 and the panel board 1 and, between the abutment plates 2 and the bottom board 7, are connections made by rotation-type joggle structures respectively. While assembling the TV cabinet of FIG. 15, the two abutment plates 2 are rotationally fastened with the panel board 1 and the bottom board 7 firstly, and then other inner components such as section boards and drawer are assembled. The other inner components do not influence the rotation-type joggle connection of the panel board 1 and the bottom board 7 with the abutment plates 2.

Figure 16:
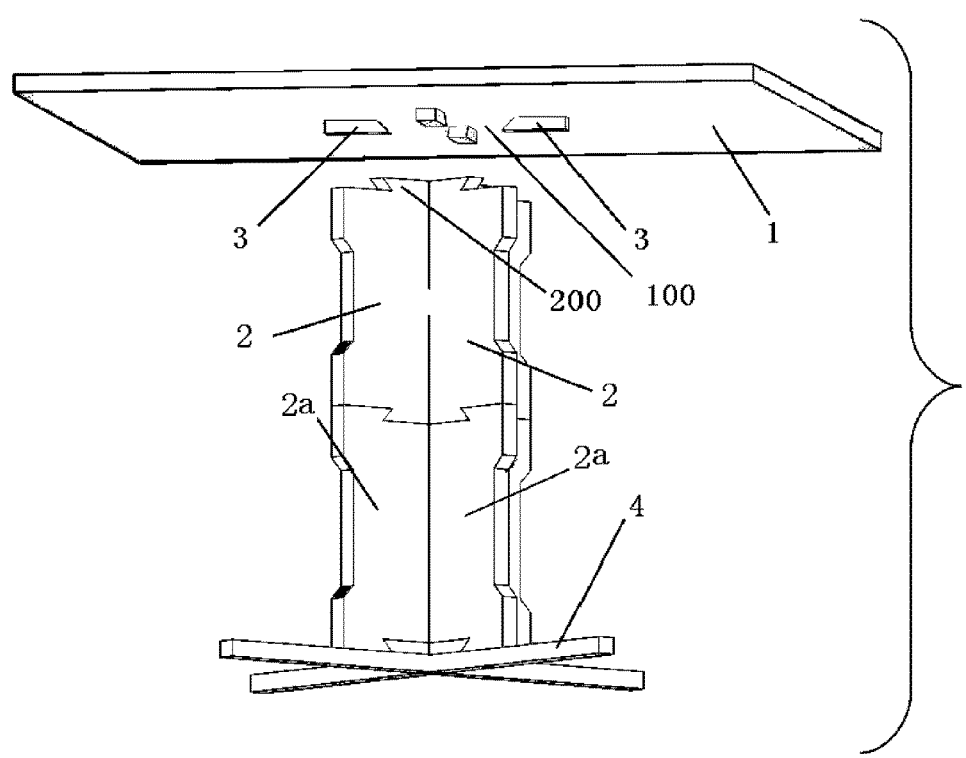
FIG. 16 is a schematic view of a furniture with the rotation-type joggle structure in accordance with a fifth exemplary embodiment of the present invention.
Figure 17:
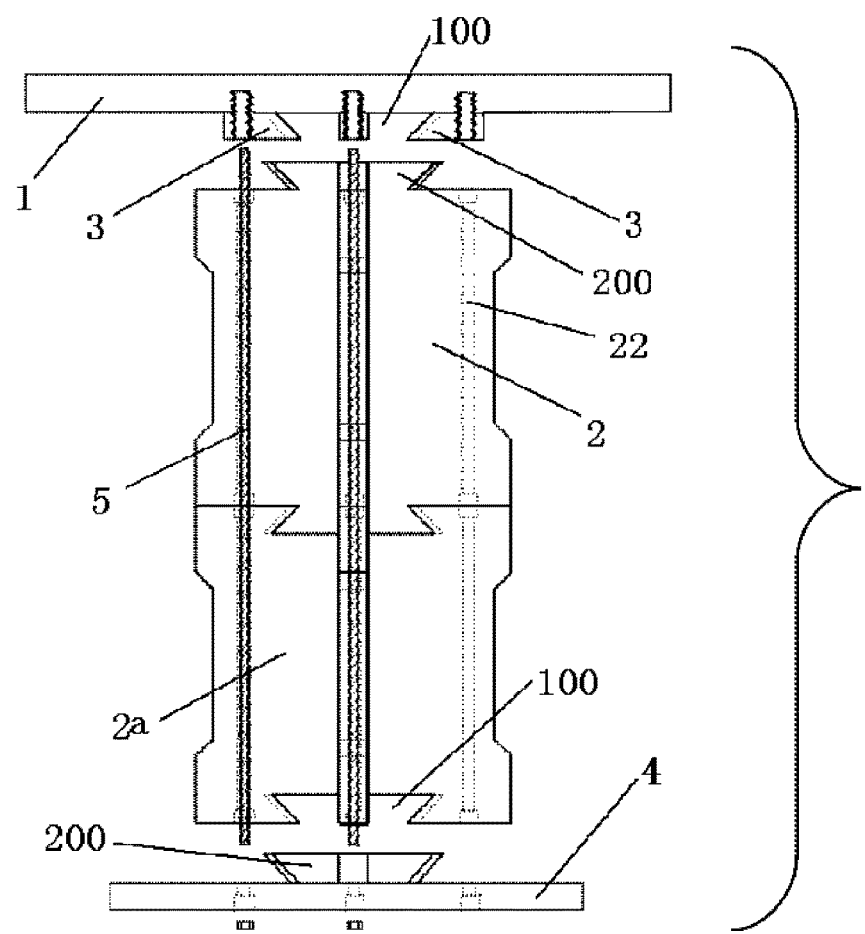
FIG. 17 is a front view of the furniture with the rotation-type joggle structure in accordance with the fifth exemplary embodiment of the present invention.

FIGS. 16 and 17 show furniture with the rotation-type joggle structure in accordance with a fifth exemplary embodiment of the present invention. The furniture of the exemplary embodiment is a tall table, comprising a panel board 1, and a two-part abutment. The first part (top part) of the abutment has two crossed abutment plates 2, and each abutment plate 2 has tongues 200 at two ends thereof respectively. The second part (bottom part) of the abutment has two crossed abutment plates 2a, and each abutment plate 2a has grooves 100 at two ends thereof respectively. The two parts of the abutment are connected by the rotation-type joggle structure. The abutment plates 2 of the top part are connected with the panel board 1 by the rotation-type joggle structure. In this exemplary embodiment, a groove component 3 is arranged on the bottom surface of the panel board 1, and the groove component 3 has two sets of opposite blocks and grooves 100 is formed between the two sets of blocks. Other structures thereof are same to those of the first exemplary embodiment, and will not described in here.

Figure 18:
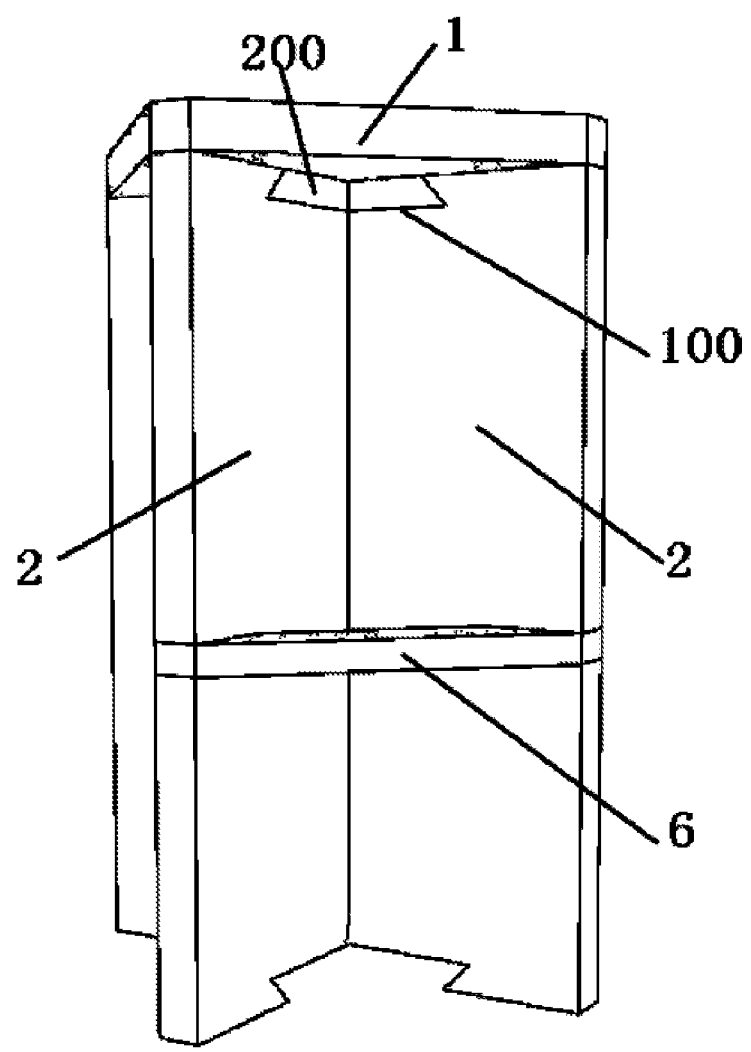
FIG. 18 is a schematic view of a furniture with the rotation-type joggle structure in accordance with a sixth exemplary embodiment of the present invention.

FIG. 18 shows furniture with the rotation-type joggle structure in accordance with a sixth exemplary embodiment of the present invention. The furniture of the exemplary embodiment is a bar chair, and is similar to the coffee table of the second exemplary embodiment of the present invention. The furniture of the exemplary embodiment comprises a panel board 1 and two crossed abutment plates 2. The two abutment plates 2 and the panel board 1 are connected by the rotation-type joggle structure. A difference from the second exemplary embodiment is that, the exemplary embodiment adds a footrest 6. The abutment plates 2 are configured with slots, and two ends of the footrest 6 are fastened into the slots. The footrest 6 is perpendicular to the abutment plates 2.

The panel board 1, abutment plates 2, bottom plate 4 and footrest 6 etc. of the above exemplary embodiments may be made of different boards, such as fiberboard, plywood, chipboard and other kinds of engineer plates. Alternatively, they may be made of solid wood or other materials.

From the above exemplary embodiments, it can be seen that, the rotation-type joggle structure of the present invention is suitable for various knock-down furniture. It should be noted that, the rotation-type joggle structure of the present invention is not limited to furniture, and it may be used in floor board, or various furnishing products or various joggling connectors which may be fixed connectors or detachable connectors.

The side faces of the tongue and of the groove for the rotation-type joggle structure of the present invention are a part of a rotational curved-surface. The tongue and the groove can be fastened and loosened only by counter-rotation between the two, and the contacting area of the tongue and the groove is larger than the conventional mortise-tongue structure, such that the joggle structure of the present invention is more solid, and the connection strength thereof is increased. Thus the joggle structure of the present invention is not easy to be loosened, and the furniture thereof can rely less on metal connectors which have small contacting areas for structural strength.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims.

What is claimed is:

1. A joggle structure, comprises a groove and a tongue for cooperating with the groove, wherein,
   the groove having a bottom surface and two groove side faces, and the width of the groove gradually increases from a groove opening to the bottom surface; the two groove side faces are a part of a rotational curved surface, rotation axis of the rotational curved surface being arranged in the middle of the two groove side faces;
   the tongue has two tongue side faces for matching with the two groove side faces, the two tongue side faces having the same shape as the groove side faces;
   in a process of engaging, the tongue is rotated with respect to the groove and joggled into the groove, the two tongue side faces being fitted to the two groove side faces thereof;
   wherein a generatrix of the rotational curved surface is a straight line.

2. A furniture comprising a panel board, an abutment plate configured for supporting the panel board, wherein the panel board and the abutment plate are connected with the joggle structure as in claim 1.

3. The furniture according to claim 2, wherein the tongue is arranged on a bottom surface of the panel board, and the groove is formed in one end of the abutment plate that connects with the panel board.

4. The furniture according to claim 3, wherein the furniture comprises two abutment plates, each of the abutment plates having a middle groove for cooperating with each other, and the two abutment plates are arranged crossed to each other.

5. The furniture according to claim 4, wherein the furniture further comprises a footrest, and a slot is arranged in each of the abutment plate, two ends of the footrest being mounted in the slots, and the footrest being perpendicular to the abutment plates.

6. The furniture according to claim 3, wherein the furniture comprises two abutment plates that are arranged in parallel.

7. The furniture according to claim 3, wherein the furniture comprises two abutment plates that are arranged crossed at a certain angle.

8. The furniture according to claim 3, wherein the furniture further comprises a bottom plate arranged under bottom end of the abutment plate, and the bottom plate is connected with the bottom end of the abutment plate.

9. The furniture according to claim 3, wherein the furniture further comprises a fixing spiral rod that passes through the abutment plate upwardly from bottom end of the abutment plate and is connected spirally to the panel board for fixing the abutment plate and the panel board together.

10. The furniture according to claim 2, wherein a groove component having the groove is formed on a bottom surface of the panel board, and the tongue is formed on one end of the abutment plate connected to the panel board.

11. The furniture according to claim 10, wherein the furniture comprises two abutment plates, each of the abutment plates having a middle groove for cooperating with each other, and the two abutment plates are arranged crossed to each other.

12. The furniture according to claim 10, wherein the furniture comprises two abutment plates that are arranged in parallel.

13. The furniture according to claim 10, wherein the furniture comprises two abutment plates that are arranged crossed at a certain angle.

14. The furniture according to claim 10, wherein the furniture further comprises a bottom plate arranged under bottom end of the abutment plate, and the bottom plate is connected with the bottom end of the abutment plate.

15. The furniture according to claim 10, wherein the furniture further comprises a fixing spiral rod that passes through the abutment plate upwardly from bottom end of the abutment plate and is connected spirally to the panel board for fixing the abutment plate and the panel board together.

* * * * *